(12) United States Patent
Jinbo et al.

(10) Patent No.: US 7,767,084 B2
(45) Date of Patent: Aug. 3, 2010

(54) OIL STRAINER

(75) Inventors: Kazunori Jinbo, Nihonmatsu (JP); Akihito Iwata, Anjo (JP); Minoru Kitabayashi, Anjo (JP); Daisuke Kitaoka, Anjo (JP)

(73) Assignees: NOK Corporation, Tokyo (JP); Aisin AW Co., Ltd., Aichi (JP)

( * ) Notice: Subject to any disclaimer, the term of this patent is extended or adjusted under 35 U.S.C. 154(b) by 281 days.

(21) Appl. No.: 11/919,996

(22) PCT Filed: Jun. 29, 2006

(86) PCT No.: PCT/JP2006/312955

§ 371 (c)(1),
(2), (4) Date: Nov. 7, 2007

(87) PCT Pub. No.: WO2007/010721

PCT Pub. Date: Jan. 25, 2007

(65) Prior Publication Data

US 2009/0045129 A1 Feb. 19, 2009

(30) Foreign Application Priority Data

Jul. 21, 2005 (JP) ............................. 2005-210758

(51) Int. Cl.
*B01D 35/30* (2006.01)
*B01D 35/02* (2006.01)
*F16N 39/06* (2006.01)
*F01M 1/10* (2006.01)
*F01M 11/03* (2006.01)

(52) U.S. Cl. .................. 210/232; 210/167.08; 210/445

(58) Field of Classification Search ................. 210/232, 210/167.08, 445
See application file for complete search history.

(56) References Cited

U.S. PATENT DOCUMENTS

| 4,402,827 | A | * | 9/1983 | Joseph | 210/314 |
|---|---|---|---|---|---|
| 4,826,598 | A | * | 5/1989 | Cain | 210/445 |
| 4,828,694 | A | * | 5/1989 | Leason | 210/167.08 |
| 5,494,575 | A | * | 2/1996 | Kitajima et al. | 210/167.04 |
| 5,538,633 | A | * | 7/1996 | Kitajima et al. | 210/445 |
| 5,538,633 | A | * | 7/1996 | Kitajima et al. | 210/445 |

FOREIGN PATENT DOCUMENTS

JP H4-37511 3/1992

(Continued)

OTHER PUBLICATIONS

International Search Report dated Aug. 1, 2006.

*Primary Examiner*—Thomas M Lithgow
(74) *Attorney, Agent, or Firm*—Jacobson Holman PLLC

(57) ABSTRACT

An oil strainer in which pressure loss by a turbulent flow in a case (10) is reduced as much as possible. The oil strainer has the case (10) having an inflow opening (112) and an outflow opening (122) that are at positions separated from each other, and also has a filter member (20) provided so as to partition the inner space of the case (10) into a space ($S_I$) on the inflow opening (112) side and a space ($S_O$) on the outflow opening (122) side. A guiding surface (13) is provided in the case (10), and the guiding surface (13) has dam-like ribs (113, 123), extends via a position behind the outflow opening (122) when viewed from the inflow opening (112) side, and converges the flow of oil toward the outflow opening (122).

2 Claims, 4 Drawing Sheets

FOREIGN PATENT DOCUMENTS

| JP | H5-14728 | | 2/1993 |
| JP | 09145487 A | * | 6/1997 |
| JP | 09-327609 | | 12/1997 |
| JP | 2004-353783 | | 12/2004 |

* cited by examiner

OIL STRAINER

This is a national stage of the International Application No. PCT/JP2006/312955 filed Jun. 29, 2006 and published in Japanese.

BACKGROUND OF THE INVENTION

1. Field of the Invention

The present invention relate to an oil strainer, for example, provided in an oil circulation system of an automatic transmission and the like of automobiles.

2. Description of the Conventional Art

FIGS. 4 (a)-4(b) show a typical oil strainer of the conventional art which is provided in an oil circulation system of a automatic transmission and the like of automobiles, wherein FIG. 4(a) is a plan view of the oil strainer, and FIG. 4(b) is a sectional view taken along the lines in FIG. 4(a).

The oil strainer shown in FIGS. 4(a)-4(b) is provided with a case 100 comprising a lower case 101 having an inflow opening 101a and an upper case 102 having an outflow opening 102a that opens at a different planar position from the inflow opening 101a, and a pouch-like filter member 103 formed by folding a sheet of the filtering material is disposed in an internal space of the case 100. An opening portion 103a formed at the lower folded section is joined to the inflow opening 101a of the lower case 101 by heat-seal or the like, and a peripheral portion of the upper case 102 and a peripheral portion of the lower case 101 are joined together in the state that the overlapped peripheral portions 103b are sandwiched between and secured by them. A plurality of ribs 101b, 102b are formed on the inner faces of the lower case 101 and upper case 102 so as to secure oil flow channels at the outside of the filter member 103 and to reinforce the lower case 101 and upper case 102.

In this type of the oil strainer, as shown by oil flows F in FIG. 4, oil flows from the inflow opening 101a of the lower case 101 into the inner space of the pouch-like filter member 103, and passes through the filter 103. When the oil passes through the filter member 103, foreign matters such as abrasion powder produced in an automatic transmission and the like are trapped and removed (filtered), while the oil filtered out of the filter member 103 is discharged outside the case 100 from the outflow opening 102a of the upper case 102 (for example, refer to Japanese unexamined patent publication No. H09-327609).

For the conventional oil strainer as described above, occurrence of pressure loss by the filter member 103 is inevitable, however, it is desirable to render the other pressure loss than that by the filter member 103 as small as possible. However, size of the case 100, area of the filter member 103, width of the oil flow channel in the case 100, and opening position of the outflow opening 102a or the like are often restricted by the installation space of the oil strainer. Therefore, according to the conventional oil strainer, a turbulent flow ΔF such as whirlpool or the like is generated in the oil flow in a space ΔS behind the outflow opening 102a, and the turbulent flow ΔF interferes with the normal flow F directing to the outflow opening 102a, thereby to cause loss of flow, and the resultant oil flow channel resistance is recognized as one of the main causes of the increase in pressure loss.

SUMMARY OF THE INVENTION

Problem to be Solved by the Invention

The present invention is made in view of the above-mentioned problem, and it is an object of the present invention to provide an oil strainer in which pressure loss by a turbulent flow in a case is reduced as much as possible.

According to a first aspect of the present invention, there is provided, as an effective means to solve the above-mentioned problem, an oil strainer comprising a case having an inflow opening and an outflow opening which are provided at positions apart from each other, a filter member provided so as to partition the inner space of the case into a space at the inflow opening side and a space at the outflow opening side, and a guiding surface which is provided in the case so as to extend via a position behind the outflow opening when viewed from the inflow opening side, so as to converge an oil flow toward the outflow opening.

In the oil strainer according to the first aspect, the guiding surface formed in the case guides the oil flow so as to converge the oil flow toward the outflow opening. Accordingly, generation of the turbulent flow which interferes with the normal flow directing to the outflow opening to cause loss of flow is prevented effectively.

According to a second aspect of the present invention, there is provided an oil strainer in the first aspect, wherein the guiding surface comprises dam-like ribs each having a curved portion extending along a portion behind the outflow opening when viewed from the inflow opening side, and each having inclined surface portions extending obliquely from the respective ends of the curved portion toward the inflow opening side.

According to a third aspect of the present invention, there is provided an oil strainer in the first aspect, wherein a plurality of reinforcing ribs are provided on an internal surface of the case to secure oil flow channels between the internal surface of the case and the filter member and to reinforce the case, and the reinforcing ribs extend so as to converge the oil flow toward the outflow opening.

According to the oil strainer as recited in any one of the first to third aspects, since generation of the turbulent flow which interferes with the normal flow directing to the outflow opening and causes loss of flow is prevented, the oil flows smoothly toward the outflow opening, and pressure loss by the oil flow channel resistance is reduced.

According to the oil strainer as recited in the second aspect, the effect obtained by the invention according to the first aspect can be realized without changing the shape of the case.

According to the oil strainer as recited in the third aspect, since a plurality of reinforcing ribs are provided to secure the oil flow channels between the inner surface of the case and the filter member and to reinforce the case, and the reinforcing ribs guide the oil flow so as to converge toward the outflow opening, generation of the turbulent flow is surely prevented, and pressure loss by oil flow channel resistance can be reduced.

BRIEF EXPLANATION OF THE DRAWINGS

FIGS. 1(A) and 1(B) are views for illustrating a preferable embodiment of the oil strainer according to the present invention, wherein FIG. 1(A) is a plan view of the oil strainer, and FIG. 1(B) is a sectional view taken along the lines in FIG. 1(A).

FIGS. 3(A) and 3(B) are view for illustrating the oil flow in the oil strainer shown in FIGS. 1(A) and 1(B), wherein FIG. 3(A) is a plan view of the oil strainer, and FIG. 3(B) is a sectional view taken along the lines in FIG. 3(A).

FIGS. 4(A) and 4(B) are views for illustrating a typical conventional oil strainer, wherein FIG. 4(A) is a plan view of the conventional oil strainer, and FIG. 4(B) is a sectional view taken along the lines I-II-III-IV in FIG. 4(A).

DETAILED DESCRIPTION OF PREFERRED EMBODIMENT

Figure 1A:
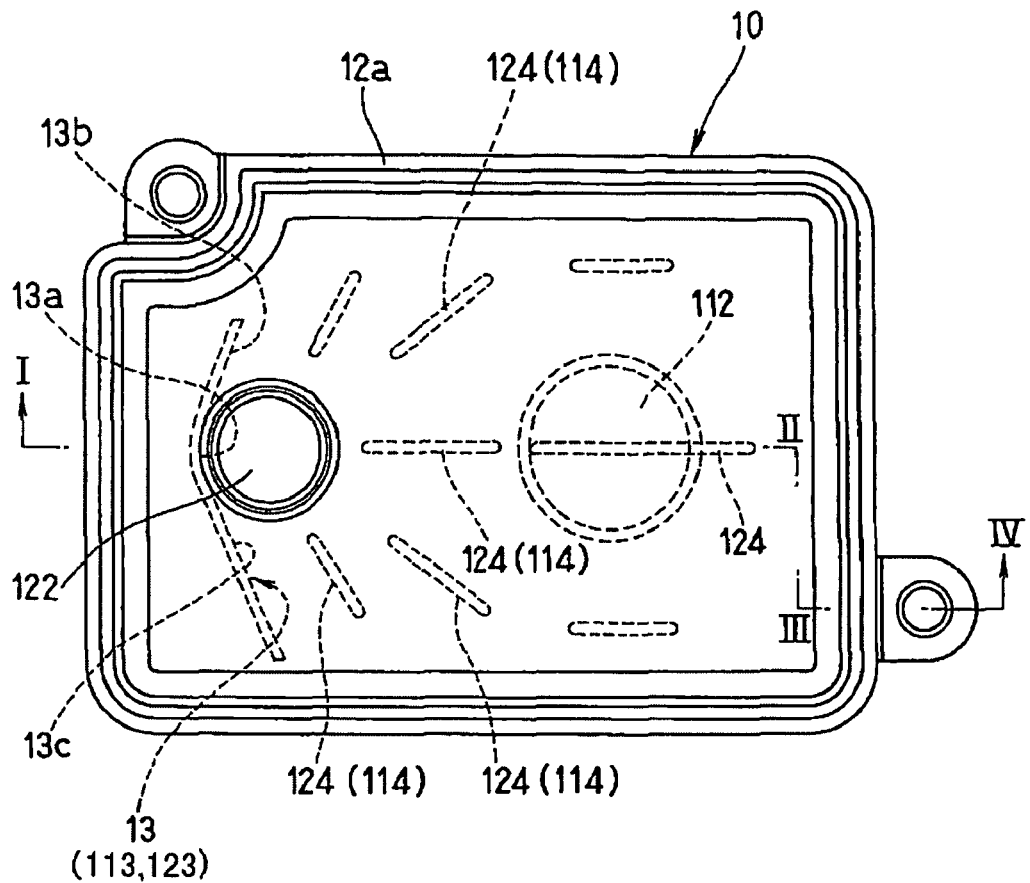
Figure 1B:
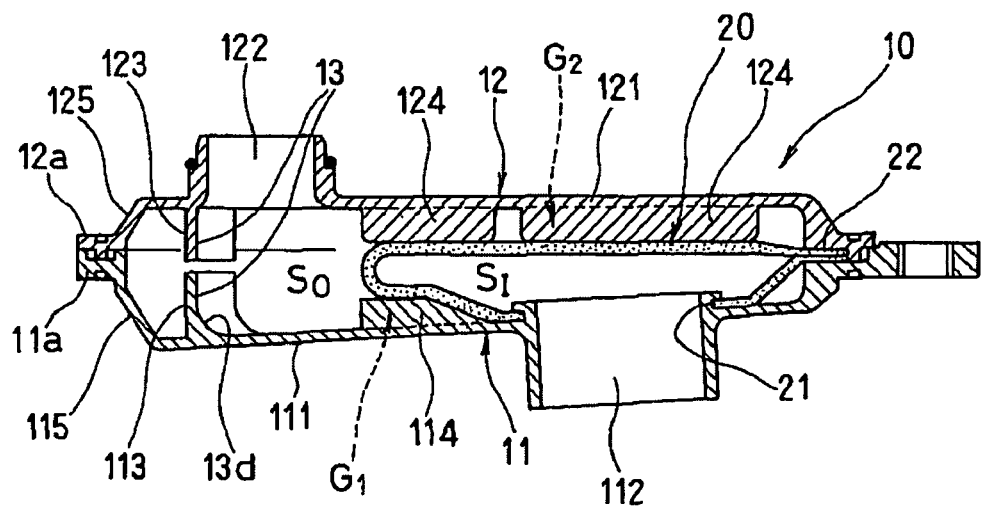
Figure 2:
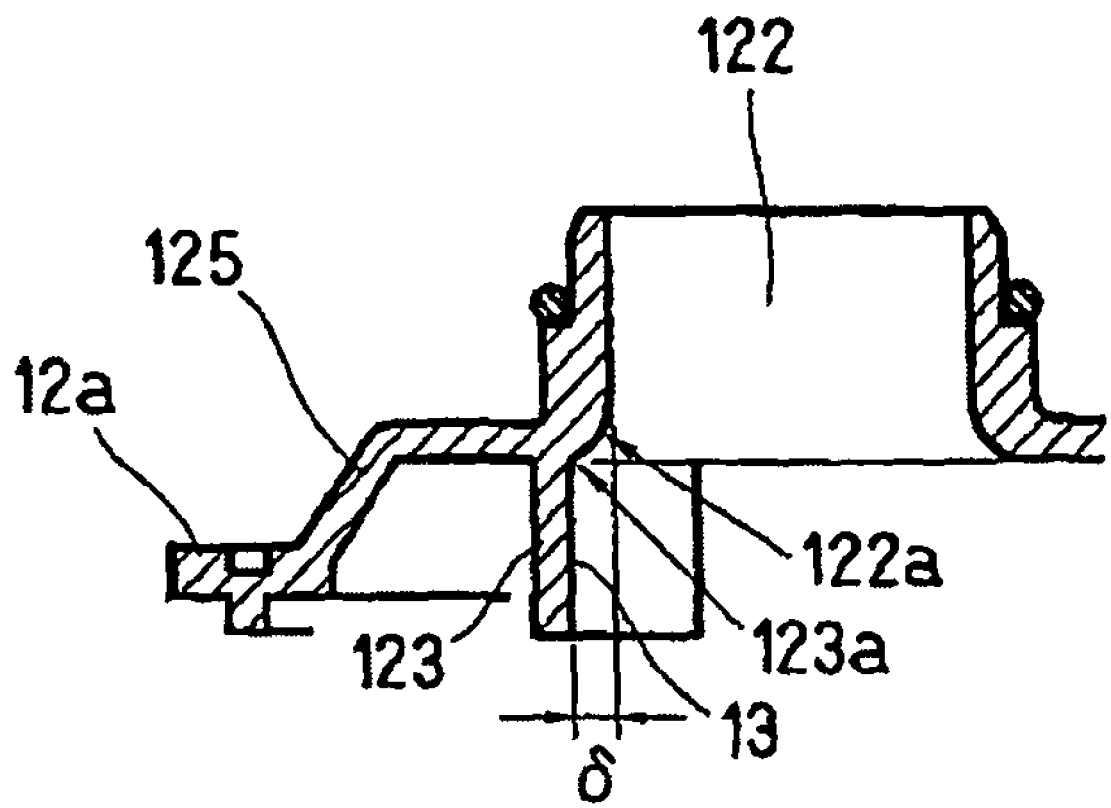
FIG. 2 is a partially enlarged sectional view in FIG. 1(B).

Hereinafter, the present invention will be explained with reference to the drawings of a preferred embodiment of the present invention. FIGS. 1(A) and 1(B) are views for illustrating an embodiment of the oil strainer according to the present invention, which is installed in an oil circulation system of an automatic transmission of automobiles, wherein FIG. 1(A) is a plan view of the oil strainer, FIG. 1(B) is a sectional view taken along the lines in FIG. 1(A), and FIG. 2 is a partially enlarged sectional view of FIG. 1(B).

The oil strainer, as shown in FIGS. 1(A)-1(B), has a case 10 comprising a synthetic resin-made lower case 11 provided with a cylindrical inflow opening 112 which opens at a position located near one end of the bottom plate 111, and a synthetic resin-made upper case 12 provided with a cylindrical outflow opening 122 which opens at a position of the upper plate 121 apart from the inflow opening 112 (a position near an opposite end to the inflow opening 112), and has a filter member 20 made of unwoven cloth and provided so as to partition an inner space of the case 10 defined with the lower case 11 and the upper case 12 into a space $S_I$ at the inflow opening 112 side and a space $S_O$ at the outflow opening 122 side.

The filter member 20 is formed in pouch-like shape by folding a sheet of unwoven cloth, and an opening portion 21 formed at the lower folded portion is joined to the outer periphery of the inflow opening 112 of the lower case 11 by heat-seal or the like, and the overlapped peripheral portions 22 are sandwiched between and secured by a peripheral portion 12a of the upper case 12 and a peripheral portion 11a of the lower case 11. Further, the peripheral portion 12a of the upper case 12 and the peripheral portion 11a of the lower case 11 are jointed together and hermetically sealed by an ultrasonic welding or the like.

A guiding surface 13 is provided on an internal surface of the case 10 so as to extend through the area just below the outer peripheral edge of the outflow opening 122 and behind the outflow opening 122 when viewed from the inflow opening 112 side. More specifically, this guiding surface 13 is formed by a pair of dam-like ribs 113 and 123 provided upright on the internal surface of the bottom plate 111 of the lower case 11 and the internal surface of the upper plate 121 of the upper case 12, respectively, so as to adjacently opposing to each other. Each of the dam-like ribs includes a curved portion 13a having a circular arc shaped section and extending along a portion behind the outflow opening 122 when viewed from the inflow opening 112 side, and inclined surface portions 13b and 13c extending obliquely from the respective ends of the curved portion 13a toward the inflow opening 112 side, thereby to present an approximate V-shaped section.

The curved portion 13a of the guiding surface 13 has a circular arc section which is concentric with the outflow opening 122, and an angle of the inclined surface portion 13b or 13c with respect to a plane defined by an axis of the inflow opening 112 and an axis of the outflow opening 122 is properly set in relation to the width of the case 10 in a direction perpendicular to the above described plane. Further, the dam-like rib 113 erected on the bottom plate 111 of the lower case 11 is formed to provide a rounded surface 13d at a base corner of the outflow opening 122 side.

Further, since the curved portion 13a of the guiding surface 13, as described above, extends through the portion behind the outflow opening 122, there is formed a stepped portion δ between an upper dam-like rib 123 of the pair of dam-like ribs 113, 123 forming the guiding surface 13 and the internal surface of the outflow opening 122, as shown in an enlarged form in FIG. 2. Further, to prevent generation of turbulent flow at the stepped portion δ, there is provided a rounded surface 122a at an inner peripheral edge of the outflow opening 122, and there is provided a rounded surface 123a at a base corner of the dam-like rib 123 under the rounded surface 122a.

The case 10 has a plurality of reinforcing ribs 114, in addition to the above described dam-like ribs 113, formed on the internal surface of the bottom plate 111 of the lower case 11 so as to project toward the upper case 12 side, and similarly, there are provided a plurality of reinforcing ribs 124, in addition to the above described dam-like ribs 123, formed on the internal surface of the upper plate 121 of the upper case 12 so as to project toward the lower case 11 side. Further, a pouch-like filter member 20 is held between the reinforcing ribs 114 and 124.

More specifically, the reinforcing ribs 114 provided at the side of lower case 11 restrict the expansion of the pouch-like filter member 20 toward the lower case 11 side to secure oil flow channels $G_1$ between the filter member 20 and the bottom plate 111 of the lower case 11 and also reinforce the bottom plate 111, while the other reinforcing ribs 124 provided at the side of upper case 12 restrict the expansion of the pouch-like filter member 20 toward the upper case 12 side to secure oil flow channels $G_2$ between the filter member 20 and the internal surface of the upper plate 121 of the upper case 12 and also reinforce the upper plate 121. Further, these reinforcing ribs 114 and 124 extend so as to guide the oil flow to be converged toward the outflow opening 122. More specifically, in the illustrated embodiment, among the reinforcing ribs 114 and 124, at least the reinforcing ribs located at the outflow opening 122 side is provided so as to extend in a direction where the respective extension lines pass through the center of the outflow opening 122.

Figure 3A:
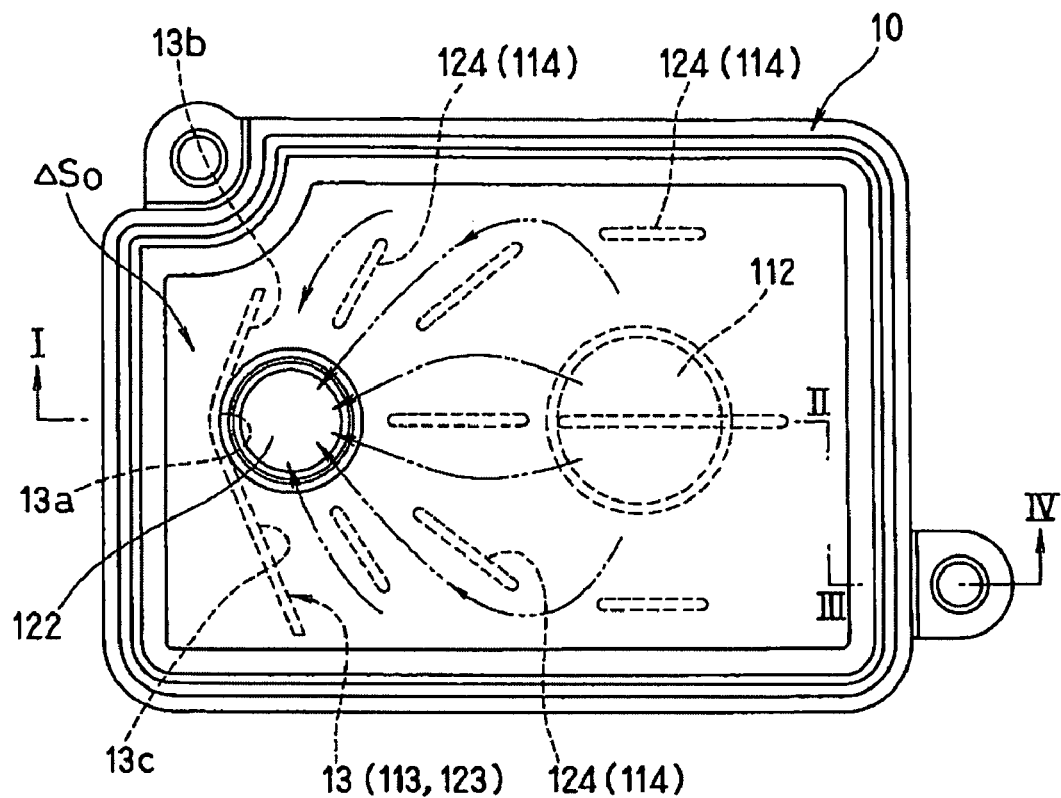
Figure 3B:
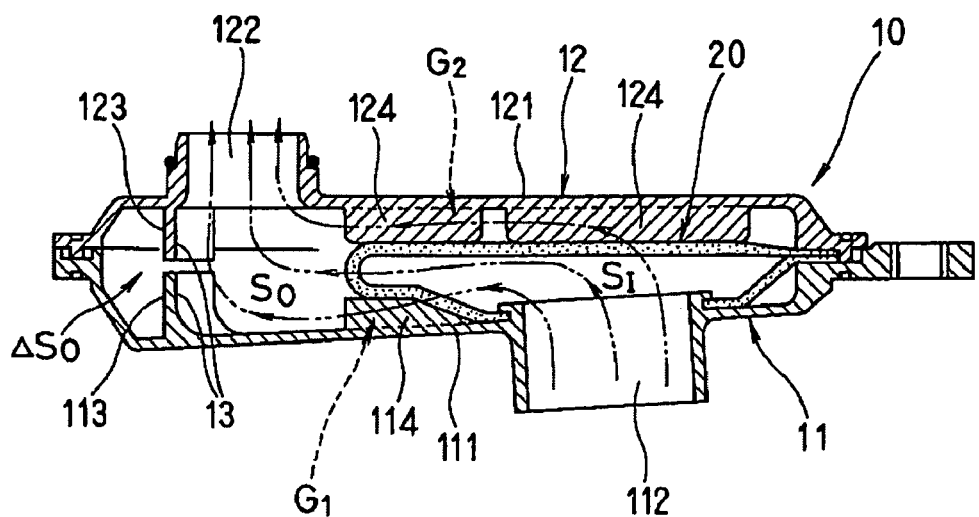
Figure 4A:
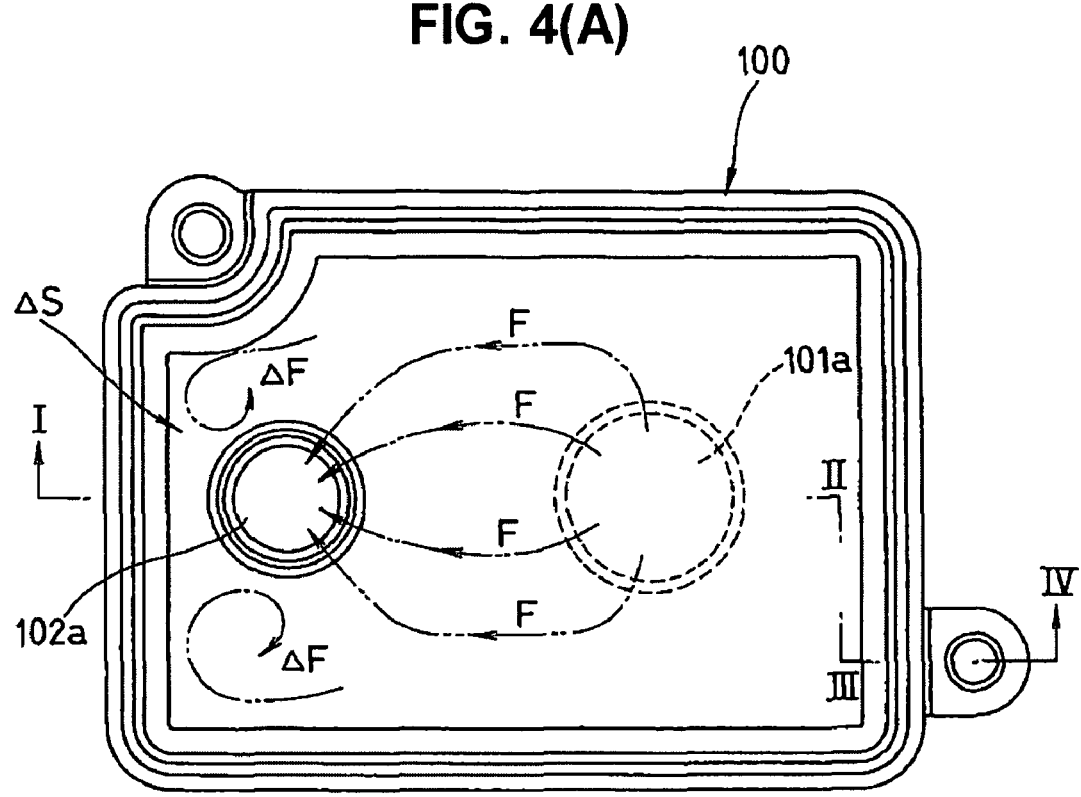
Figure 4B:
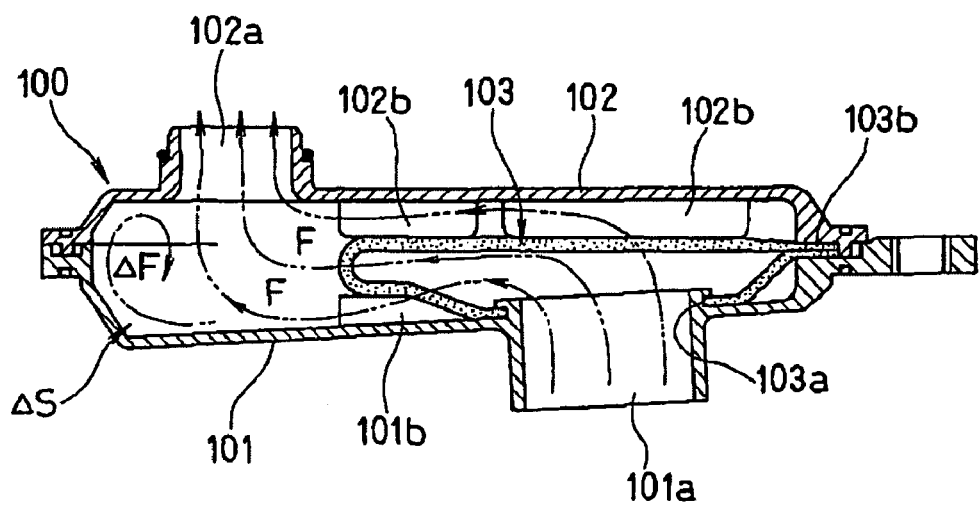

FIGS. 3(A) and 3(B) illustrate the oil flow in the oil strainer, wherein FIG. 3(A) is a plan view of the oil strainer, and FIG. 3(B) is a sectional view taken along the lines in FIG. 3(A). As shown by arrows indicated with two-dotted line, the oil flowing into the space $S_I$ inside the pouch-like filter member 20 from the inflow opening 112 passes through the filter member 20, and on this occasion, foreign matters such as abrasion powder contained in the oil are separated and removed (filtered) from the oil. And the oil passing through the pouch-like filter member 20 to the lower case 11 side flows toward the outflow opening 122 through the oil flow channels $G_1$ in the space $S_O$ outside the filter member 20, while the oil passing through the filter member 20 to the upper case 12 side flows toward the outflow opening 122 through the oil flow channels $G_2$ in the space $S_O$.

At this moment, the oil passing through the oil flow channel $G_1$ is guided by a plurality of the reinforcing ribs 114 provided on the bottom plate 111 of the lower case 11 in such a direction as to converge the oil flow toward the outflow opening 122, and similarly, the oil passing through the oil flow channel $G_2$ is guided by a plurality of the reinforcing ribs 124 provided on the upper plate 121 of the upper case 12 in such a direction as to converge the oil flow toward the outflow opening 122.

Further, at positions just beneath the outflow opening 122 the flow is guided toward the outflow opening 122 by the guiding surface 13 (dam-like ribs 113, 123). Namely, the guiding surface 13 prevents the oil from flowing into a space $\Delta S_O$ behind the dam-like ribs 113, 123, by the respective inclined surface portions 13b, 13c, as shown in FIG. 3(A), and guide the oil flow in such a direction as to converge toward the region just below the outflow opening 122, and also guide the oil flow upwardly toward the outflow opening 122, as shown in FIG. 3(B).

Here, the space $\Delta S_O$ behind the dam-like ribs 113, 123 is a place in the conventional oil strainer where turbulent flow, which interferes with the oil flow toward the outflow opening 122, occurs to produce oil flow channel resistance, however, oil flowing into the space $\Delta S_O$ is prevented and the oil flow is guided toward the outflow opening 122 by the dam-like ribs 113, 123, thereby occurrence of such turbulent flow is prevented. Further, since the lower dam-like rib 113 constituting the guiding surface 13 is formed to have the rounded face 13d at the base corner of the outflow opening 122 side, occurrence of turbulent flow, which occurs when nearly horizontal oil flow from the oil flow channel $G_1$ side is changed to an upward flow by the guiding surface 13, is prevented. Further, the oil flow guided upwardly by the lower dam-like rib 113 passes by the stepped portion δ between the upper dam-like rib 123 and the internal surface of the outflow opening 122, however, occurrence of turbulent flow at the stepped portion δ is prevented due to the smoothed surfaces formed by the rounded surfaces 122a, 123a, as shown in FIG. 2. Further, the dam-like rib 113 is increased in mechanical strength at the root thereof by the rounded surface 13d, and similarly, the dam-like rib 123 is increased in mechanical strength at the root thereof by the rounded surfaces 122a, 123a.

Therefore, provision of the reinforcing ribs 114, 124 and the guiding surface 13 (dam-like ribs 113, 123) enables the oil flow within the case 10 to be smooth so that pressure loss due to the oil flow channel resistance other than that by the filter member 20 is reduced effectively. Further, since the guiding surface 13 is formed by the dam-like ribs 113, 123, it is not necessary to modify the shape of the case 10.

Incidentally, while the guiding surface 13 is formed by a pair of dam-like ribs 113, 123 provided adjacently opposing to each other on the respective lower and upper cases 11, 12 in the above embodiment, the guiding surface 13 may also be formed by, for example, a dam-like rib provided on the bottom plate 111 of the lower case 11 projecting upwardly so that the upper end thereof is adjacently opposed to the upper plate 121 of the upper case 12.

Further, the respective ends of the dam-like ribs 113, 123 may be continuous with the side wall (side wall 115 of the lower case 11 or side wall 125 of the upper case 12) of the case 10, and the guiding surface 13 may be formed on the inner surfaces of the side wall 115 of the lower case 11 and the side wall 125 of the upper case 12 (referring to FIG. 1(B)).

As having been described above, the present invention is useful to prevent occurrence of oil turbulent flow in the oil strainer attached to an automatic transmission or the like of automobiles, and to reduce the pressure loss due to oil flow channel resistance.

What is claimed is:

1. An oil strainer comprising:
   a case having an inflow opening and an outflow opening which are provided at positions apart from each other;
   a filter member provided so as to partition an inner space of the case into a space ($S_I$) at the inflow opening side and a space ($S_O$) at the outflow opening side; and
   a guiding surface which is provided in the case so as to extend via a position behind the outflow opening when viewed from the inflow opening side, so as to converge a flow of oil toward the outflow opening;
   wherein the guiding surface comprises dam-like ribs each having a curved portion extending along a portion behind the outflow opening when viewed from the inflow opening side, and each having inclined surface portions extending obliquely from the respective ends of the curved portion toward the inflow opening side.

2. The oil strainer as claimed in claim 1, wherein a plurality of reinforcing ribs are provided on an internal surface of the case to secure oil flow channels ($G_1$, $G_2$) between the internal surface of the case and the filter member and to reinforce the case, and the reinforcing ribs extend so as to converge the oil flow toward the outflow opening.

* * * * *